US010866369B2

(12) United States Patent
Takano et al.

(10) Patent No.: US 10,866,369 B2
(45) Date of Patent: Dec. 15, 2020

(54) GEL STICK CLEANER WITH REUSABLE HANDLE AND DISPOSABLE CARTRIDGE

(71) Applicant: SENKO Advanced Components, Inc., Marlborough, MA (US)

(72) Inventors: Kazuyoshi Takano, Southborough, MA (US); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 409 days.

(21) Appl. No.: 15/909,250

(22) Filed: Mar. 1, 2018

(65) Prior Publication Data

US 2018/0267252 A1    Sep. 20, 2018

Related U.S. Application Data

(60) Provisional application No. 62/473,782, filed on Mar. 20, 2017.

(51) Int. Cl.
*G02B 6/38* (2006.01)
*B08B 7/00* (2006.01)

(52) U.S. Cl.
CPC .......... *G02B 6/3866* (2013.01); *B08B 7/0028* (2013.01); *B08B 2240/02* (2013.01); *G02B 6/3821* (2013.01); *G02B 6/3893* (2013.01)

(58) Field of Classification Search
CPC ...... G02B 6/3866; G02B 6/3898; B08B 1/00; B08B 1/001; B08B 1/003; B08B 1/006; B08B 11/00; B08B 13/00; B08B 2240/02

USPC ............. 15/104.001, 104.002, 210.1, 244.1; 385/134, 147

See application file for complete search history.

(56) References Cited

U.S. PATENT DOCUMENTS

| 6,125,227 | A | 9/2000 | Cox |
| 6,209,163 | B1 | 4/2001 | Clairadin et al. |
| 6,839,935 | B2 | 1/2005 | Kiani et al. |
| 7,089,624 | B2 | 8/2006 | Malevants et al. |
| 7,215,864 | B1 | 5/2007 | Qian et al. |
| 8,245,845 | B1 | 8/2012 | Huddleston |
| 9,825,839 | B2 | 11/2017 | Metts et al. |
| 2007/0218775 | A1* | 9/2007 | Coronado ............. H01R 43/26 439/681 |
| 2010/0199447 | A1 | 8/2010 | Mercado et al. |
| 2013/0156379 | A1* | 6/2013 | Ott .......................... G02B 6/36 385/76 |
| 2014/0072265 | A1* | 3/2014 | Ott ..................... B29D 11/0075 385/87 |

(Continued)

*Primary Examiner* — Mark Spisich
(74) *Attorney, Agent, or Firm* — Edward S Jarmolowicz, Esq

(57) ABSTRACT

A cleaning device is provided for removing debris from an end surface of a fiber optic connector. The fiber optic connectors may be a Multi Push On (MPO) or Mechanical Transfer (MT). The end surface may have a one or more ferrules with a fiber optic glass cable. The cleaning device includes a housing with a first end open to a gel that adheres to debris. A second end of the housing may be releasably attached to a protrusion or handle to insert and remove the device from an adapter receptacle. The handle may be replaced with a plug frame and protrusion so the device may be inserted into the receptacle of the adapter. The device may be placed over the end surface of the fiber optic connector that is not inserted into an adapter receptacle.

12 Claims, 10 Drawing Sheets

(56) References Cited

U.S. PATENT DOCUMENTS

| | | | | |
|---|---|---|---|---|
| 2015/0362681 A1* | 12/2015 | Watte | ............... | G02B 6/3866 |
| | | | | 385/58 |
| 2015/0378109 A1* | 12/2015 | Samal | ............... | G02B 6/3809 |
| | | | | 385/58 |
| 2016/0349459 A1* | 12/2016 | Collier | ............... | G02B 6/3849 |
| 2016/0349460 A1* | 12/2016 | Collier | ............... | G02B 6/3849 |
| 2018/0231717 A1* | 8/2018 | Takanashi | ............... | B08B 1/00 |
| 2019/0258010 A1* | 8/2019 | Anderson | ............... | G02B 6/382 |

* cited by examiner

GEL STICK CLEANER WITH REUSABLE HANDLE AND DISPOSABLE CARTRIDGE

CROSS REFERENCE TO RELATED APPLICATIONS

This application claims priority to U.S. Provisional Patent Application No. 62/473,782, filed on Mar. 20, 2017.

FIELD OF INVENTION

This invention present disclosure relates generally to tools and methods for cleaning optical connectors and adapters.

BACKGROUND

The present disclosure relates generally to tools and methods for cleaning optical connectors and adapters.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

The use of optical connectors and ferrules has exploded as the need for faster data transfer has increased. Due to the nature of fiber optics (i.e., that they are optical in nature), maintaining a clean connection is important to reduce data loss or corruption. With the increase in use of fiber connectors, systems and methods have been introduced to protect ferrules from dirt and debris, as well a to clean them. However, current methods fall short of what is needed to adequately clean and maintain fiber ferrules.

SUMMARY OF THE INVENTION

According to one aspect of the invention, the cleaning heading is releaseably attached from a body of the cleaning device. The cleaning head contains a gel preloaded into the front end of the head. The cleaning head is sized and shaper to fit into a standard adapter capable of securing a LC and MPO connector. The head is made to slidably release from one end of the cleaning device body.

According to another aspect of the invention, the cleaning device body is spring loaded to releaseably attach the cleaning head from the body. The body has body may have protrusion that locks the head. Further the body may have a cavity to accept the compressed spring which biases the head forward preventing it from being unlocked during use.

According to another aspect of the invention, a dust cap is placed over the exposed gel end of the cleaning hear to protect against debris from soiling the gel stick area, and prolonging the cleaning device life. The gel stick body may have grip surface for ease of use. The gel stick cleaning head is sized to ensure it does not engage the internal latching or securing mechanism of the port or adapter inserted therein to clean the connector optic fibers.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "connector," as used herein, refers to a device and/or components thereof that connect a first module or cable to a second module or cable. The connector may be configured for fiber optic transmission or electrical signal transmission. The connector may be of any suitable type now known or later developed, such as, for example, a ferrule connector (FC), a fiber distributed data interface (FDDI) connector, an Lucent Connector (LC) connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally relate to a system and method for removing dirt and debris from a connector as disclosed herein. In some embodiments, a gel is pressed against the surface of an optical connector where one or more ferrules or one or more lensed ferrules exist. The gel may have adhesive properties which allow dirt and/or debris to be attracted or "stuck" to it. Removing the gel from the face of the connector thus removes the dirt and/or debris from the connector as well.

Figure 1A:
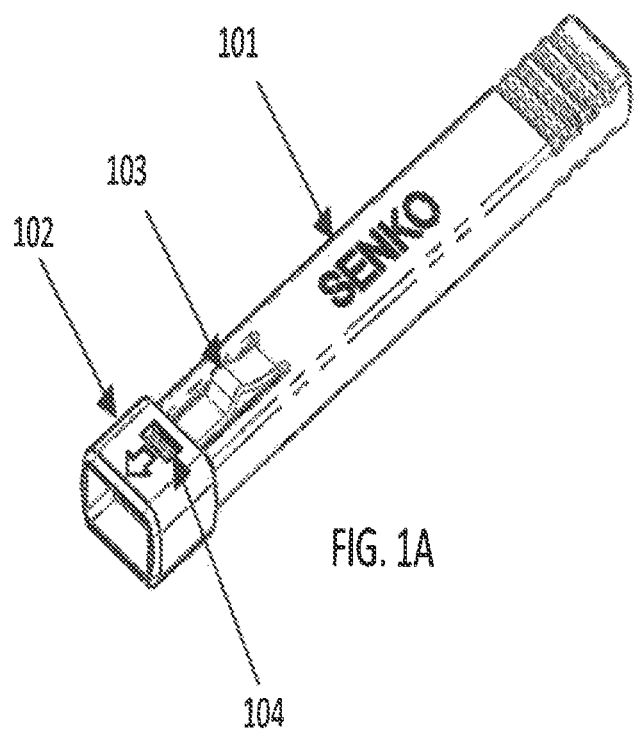
FIG. 1A is a perspective view of an example gel stick with replaceable cartridge.
Figure 1B:
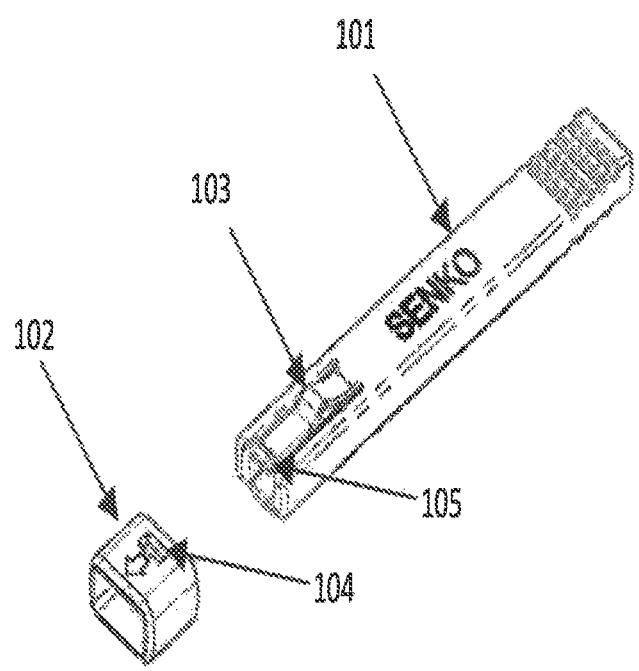
FIG. 1B is another perspective view of an example gel stick wherein the replaceable cartridge is removed.

FIG. 1A shows a perspective view of a gel stick. In some embodiments, the gel stick may comprise a body or stick portion 101 and a replaceable cartridge 102. As shown in FIG. 1B, the stick 101 and the replaceable cartridge 102 may be separated. This allows for the replaceable cartridge 102 to be replaced when it is at end of life. Due to the nature of adhesive gel, as more and more debris is removed from optical connectors, it adheres to the gel's surface, thus making the gel less effective over time after multiple uses. As shown in FIGS. 1A and 1B, the stick 101 may, in further embodiments, comprise a spring loaded connector 103 to interlock with the replaceable cartridge 102.

By way of non-limiting example, the replaceable cartridge 102, may have a groove or cavity 104, wherein the spring loaded connector 103 interlocks with the replaceable cartridge. The spring loaded connector 103, may comprise a raised portion 105, as shown in FIG. 1B, which is complementary to the groove or cavity 104. The raised portion 105, may snap up into the groove or cavity 104, of the replaceable cartridge 102, thereby securing the replaceable cartridge to the stick 101 allowing for proper use as discussed herein.

Figure 2A:
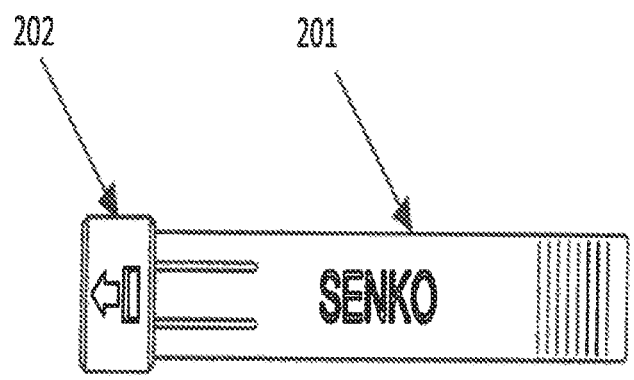
FIG. 2A is a top view of an example gel stick with replaceable cartridge.
Figure 2B:
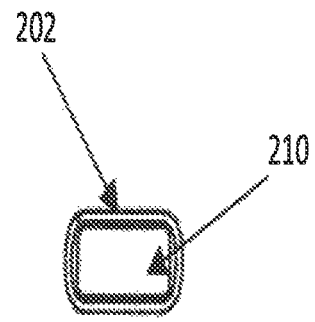
FIG. 2B is a front view of an example replaceable cartridge.

Referring briefly to FIG. 2A, a top view of the gel stick 201 and replaceable cartridge 202 is shown. In some embodiments, the replaceable cartridge may have a visual indicator, (e.g., an arrow) to demonstrate the proper orientation of the replaceable cartridge 202. FIG. 2B shows a front view of the replaceable cartridge 202. The shape of the cartridge is specifically chosen in order to fit a variety of connectors and adapters. In some embodiments, the internal area of the replaceable cartridge is filled with the gel 210.

Figure 3:
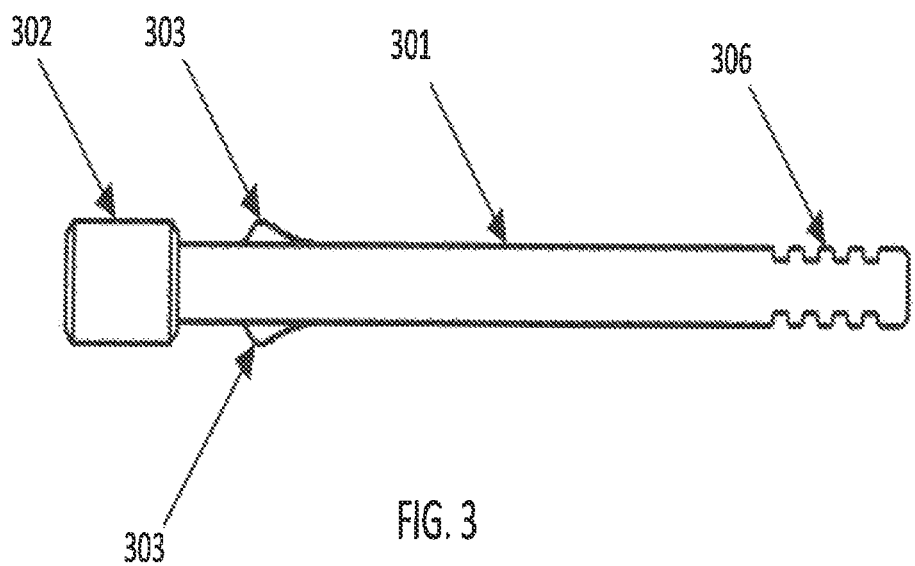
FIG. 3 is a side view of an example gel stick with replaceable cartridge.

FIG. 3 shows a side view of the of the stick 301 and the replaceable cartridge 302. As discussed herein, the stick 301 may, in some embodiments, comprise a spring loaded connector 303 which allows for connection and release from the replaceable cartridge 302. The stick 301, may also comprise a grip section 306. It should be understood, that the grip section 306 can be of any form that allows for additional grip of the stick 301, and that the grip shown is for exemplary purposes only.

Figure 4A:
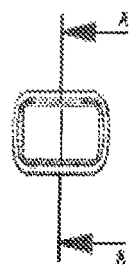
FIG. 4A is a front view of an example replaceable cartridge.
Figure 4B:
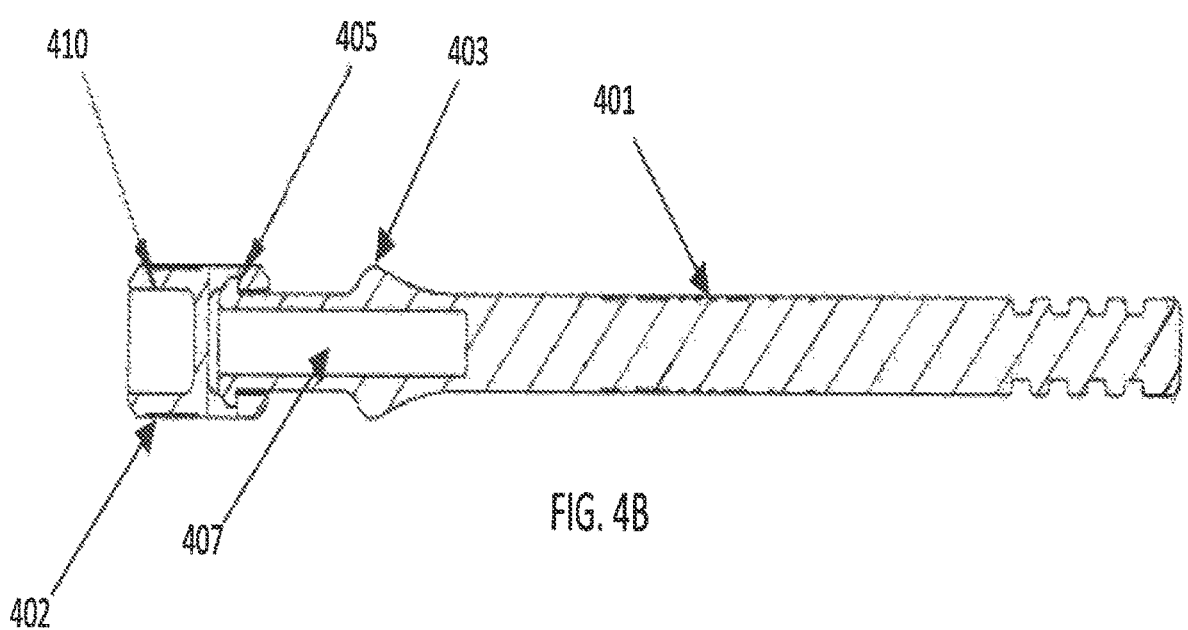
FIG. 4B is a cross sectional view of an example gel stick with replaceable cartridge.

Referring now to FIG. 4A, a front view of the replaceable cartridge 402 is shown. FIG. 4B depicts a cross sectional view of the stick 401 connected to the replaceable cartridge 402. In some embodiments, as discussed herein, the stick 401 may comprise a spring loaded connector 403. The spring loaded connector 403 may further comprise a raised portion 405 which interlocks with the replaceable cartridge 402. In some further embodiments, the stick 401 may comprise a cavity 407 which allows for compression of the spring loaded connector 403. When the spring loaded connector 403 is compressed, the raised portion 405 is disengaged from the recess of the replaceable cartridge, and the cartridge may be removed. Additionally, as discussed herein, some embodiments may comprise a cleaning gel 410 within in the removable cartridge.

Figure 5:
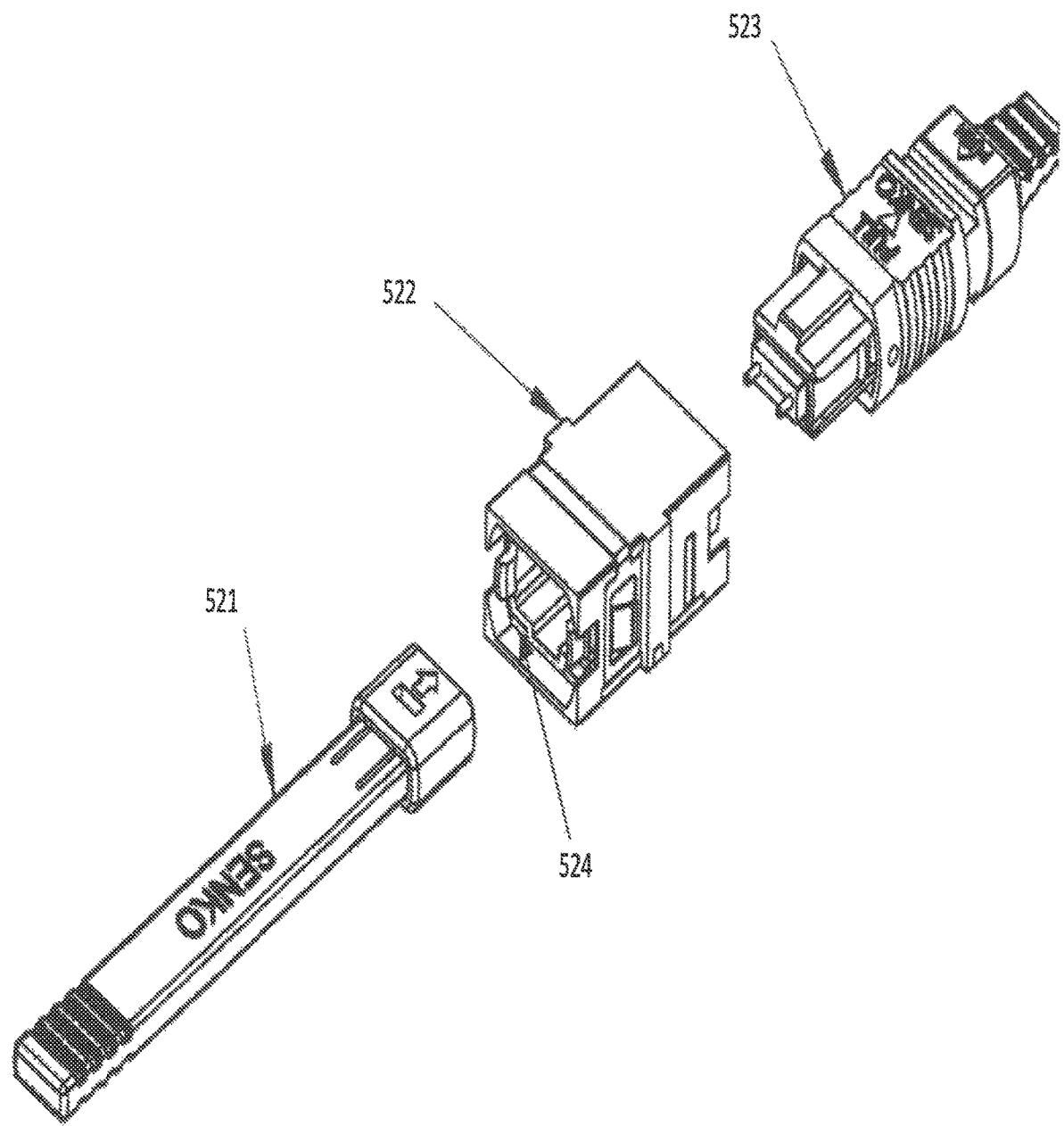
FIG. 5 is a perspective view of an example gel stick with replaceable cartridge, an optical adapter, and an optical connector.

As discussed herein, some embodiments may be able to clean a fiber connector while the connector is housed within an adaptor. For example, referring to FIG. 5, an embodiment is shown where the gel stick 521, a Multi-fiber Push-On (MPO) adapter 522, and an MPO connector 523 are shown disconnected for added detail. In this specific non-limiting embodiment, the gel stick 521 is of the correct form factor to be inserted into the channel 524 of the MPO adaptor 522 and reach the end and ferrules of the MPO connector 523.

Figure 6A:
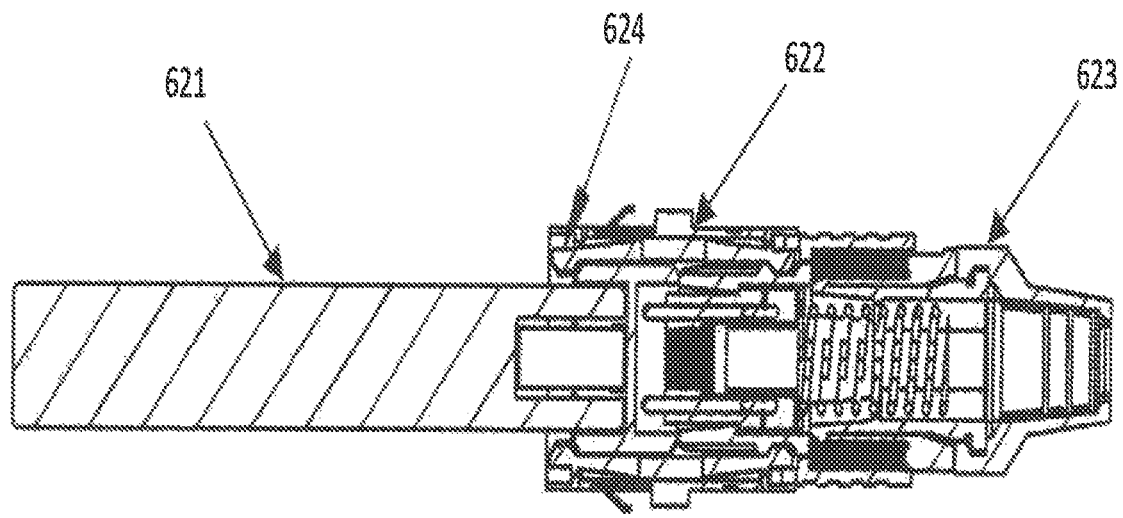
FIG. 6A is a top down cross sectional view of an example gel stick and replaceable cartridge inserted into an optical adapter and in contact with an optical connector.
Figure 6B:
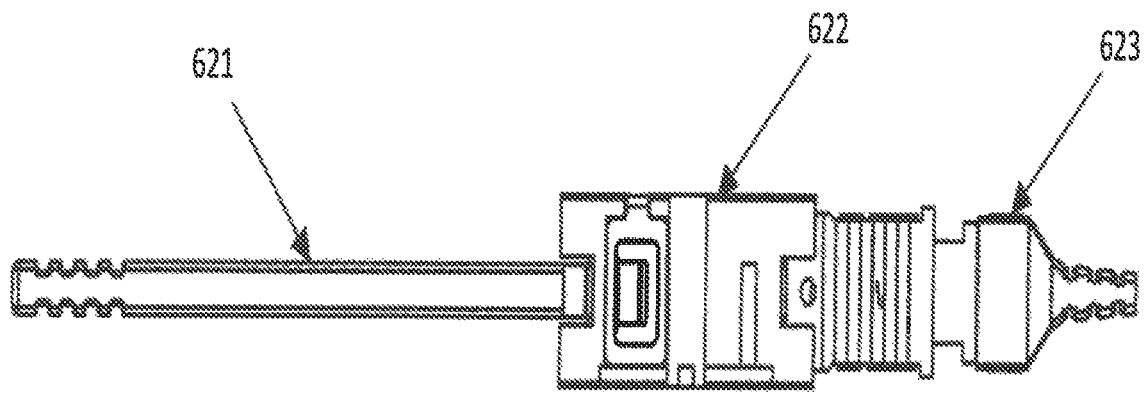
FIG. 6B is a cross sectional side view of an example gel stick and replaceable cartridge inserted into an optical adapter and in contact with an optical connector.

Further example embodiments are shown in FIGS. 6A and 6B, where a gel stick 621, an MPO adaptor 622, and an MPO connector 623 are combined in a manner similar to how they would be in the field. Specifically, wherein the gel stick 621 goes through the MPO adapter 622 and contacts the end of the MPO connector 623 thereby cleaning the connector end and ferrules. In some embodiments, and as shown, the gel stick is of such a dimension as to not interact or connect with a latching mechanism 624 on the MPO adapter. As shown, FIG. 6A is a top down cross sectional view of the system, and FIG. 6B shows a cross sectional view of the system from the side.

Figure 7A:
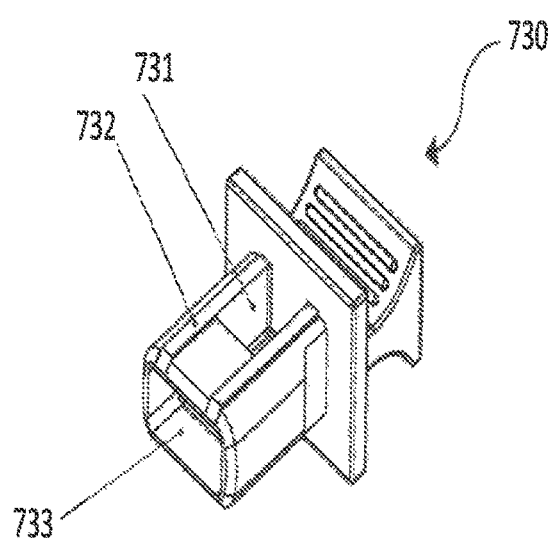
FIG. 7A is a perspective view of an example dust cap.

In some further embodiments, the concepts described herein may be applied via other methods. For example, dust caps can be used in certain instances to protect optical connectors (e.g., MPO connectors) or optical adaptors (e.g., MPO adapters) by placing a connector inside the dust cap, or inserting a dust cap into the open end of an adapter. Referring now to FIGS. 7A-7D, embodiments are shown involving a dust cap 730 for use with an optical adapter are shown. FIG. 7A is an perspective view of an example dust cap 730 comprising a cutout 731. The cutout 731 may allow for easy insertion of a replaceable cartridge, as discussed herein to allow for replacement of the gel once it reaches end of life. The dust cap 730 may also comprise one or more raised portions 732 which allow the dust cap to fit tightly within its future housing. Finally, the dust cap 730 may also comprise a cleaning cavity 733 wherein the optical connector would be received and pressed directly into the gel. This offers two levels of dust and debris protection. First, the dust cap 730 helps prevent unwanted items from contacting the optical connector. Also, the inclusion of the gel insures that if anything did contact the optical connector, that it adhered to the gel surface when the dust cap 730 is removed.

Figure 7B:
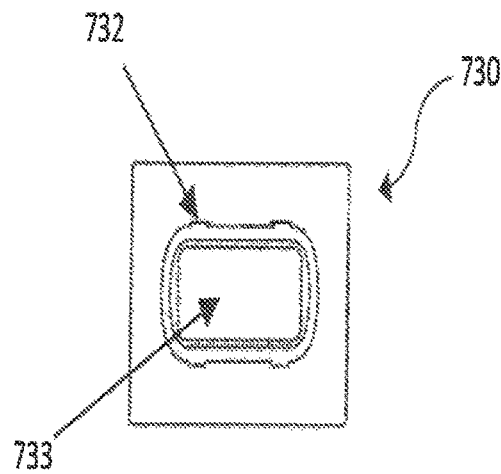
FIG. 7B is a front view of an example dust cap.
Figure 7C:
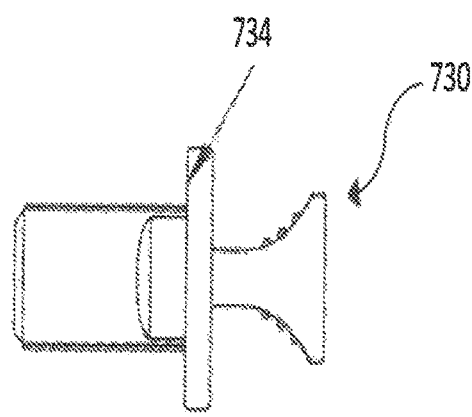
FIG. 7C is a side view of an example dust cap.
Figure 7D:
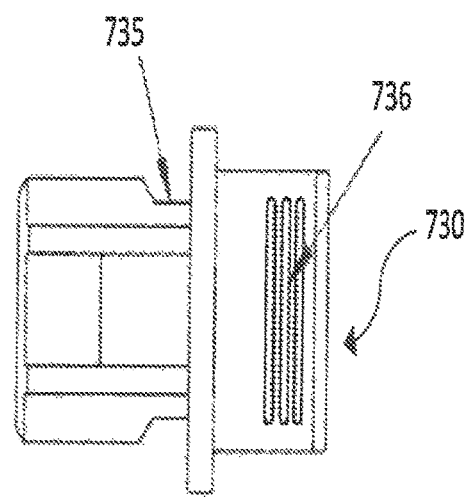
FIG. 7D is a top view of an example dust cap.

FIG. 7B shows a front view of the dust cap 730. As shown, and in some embodiments, the dust cap 730 may comprise one or more raised portions 732 and a cleaning cavity 733 for housing the cleaning gel. FIG. 7C shows a side view of the dust cap 730, wherein the plug wall 734 is clearly visible. In some embodiments, such as that shown, a dust cap 730 may comprise a plug wall 734 which sits against the face of an adapter to prevent dust from getting into the adapter. FIG. 7D shows a top view of a dust cap 730 wherein the dust cap comprises an indention 735 to allow for the hooks within a typical optical adapter to rest. Moreover, the dust cap 730 may, in some embodiments, comprise a grip system 736 for firmly grasping and removing the dust cap from an adapter.

Figure 8:
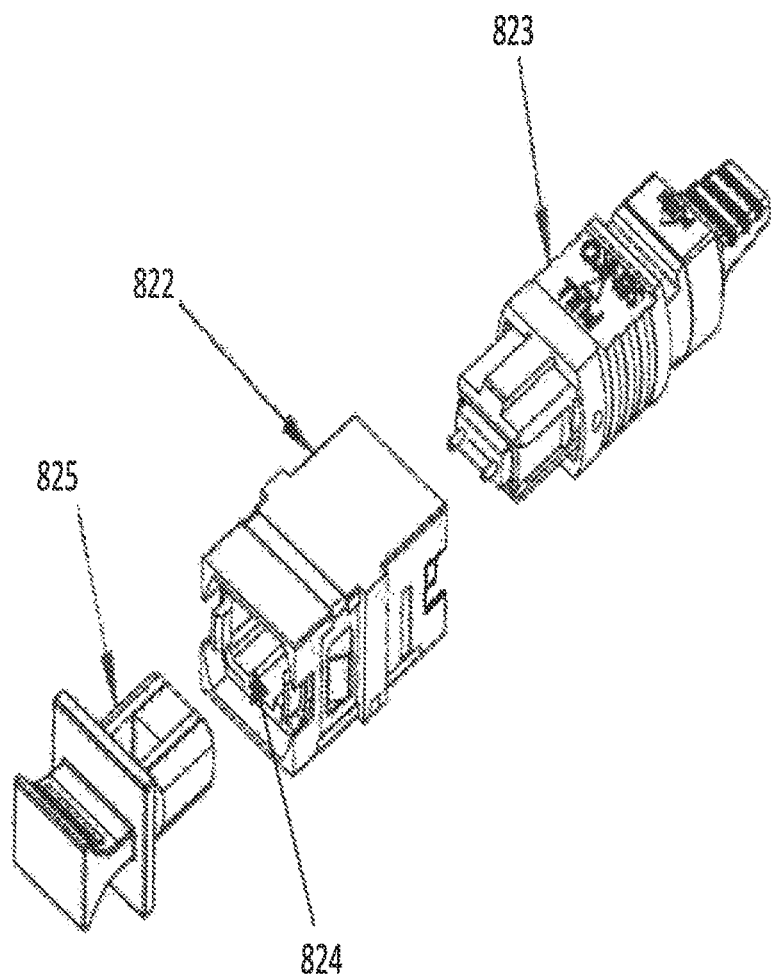
FIG. 8 is a perspective view of an example dust cap, an optical adapter, and an optical connector.

As discussed herein, some embodiments may be able to clean a fiber connector while the connector is housed within an adaptor using a dust cap. For example, referring to FIG. 8, an embodiment is shown where the dust cap 825, a Multi-fiber Push-On (MPO) adapter 822, and an MPG connector 823 are shown disconnected for added detail. In this specific non-limiting embodiment, dust cap 825 is of the correct form factor to be inserted into the channel 824 of the MPO adaptor 822 and reach the end and ferrules of the MPO connector 823.

Figure 9A:
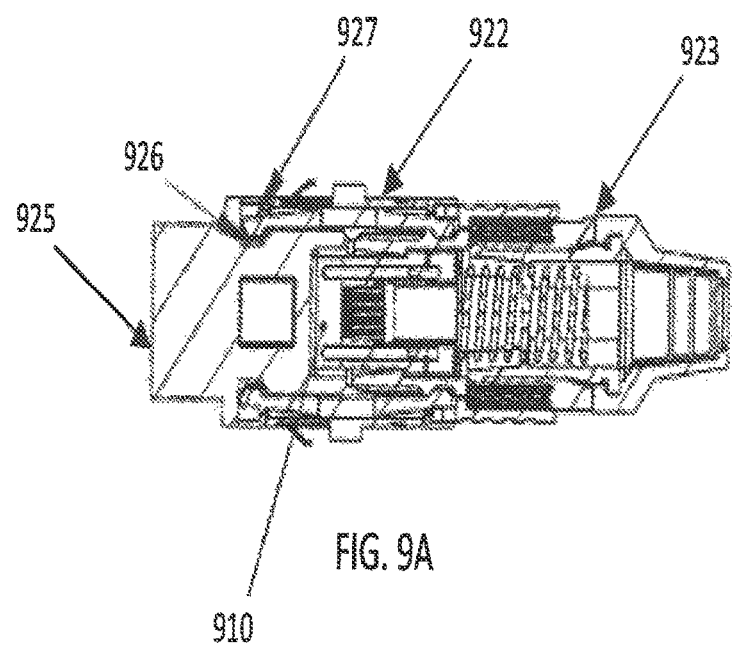
FIG. 9A is a top down cross sectional view of an example dust inserted into an optical adapter and in contact with an optical connector.
Figure 9B:
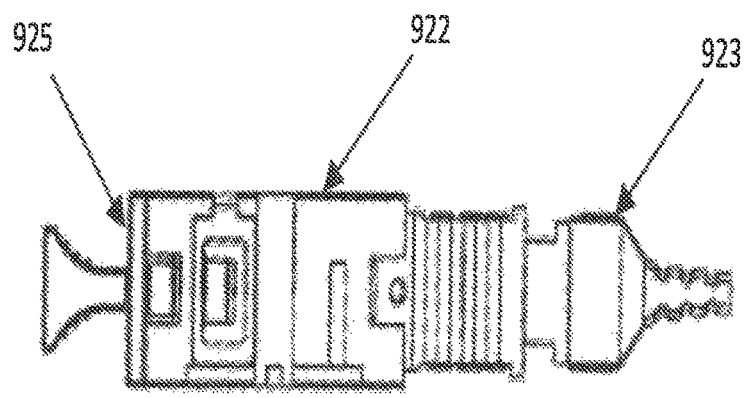
FIG. 9B is a cross sectional side view of an example dust inserted into an optical adapter and in contact with an optical connector.

Further example embodiments are shown in FIGS. 9A and 9B, wherein a dust cap 925, the MPO adaptor 922, and the MPO connector 923 are combined in a manner similar to how they would be in the field. Specifically, the dust cap 925 goes through the MPO adapter 922 and contacts the end of the MPO connector 923 thereby cleaning the connector end and ferrules. In additional embodiments, a cut out 926 may be present in the dusk cap 925, which interacts with the typical adaptor hooks (e.g., MPO adapter hook) 927 as shown. As discussed herein, the gel 310 is present in the dust cover 925.

Figure 10A:
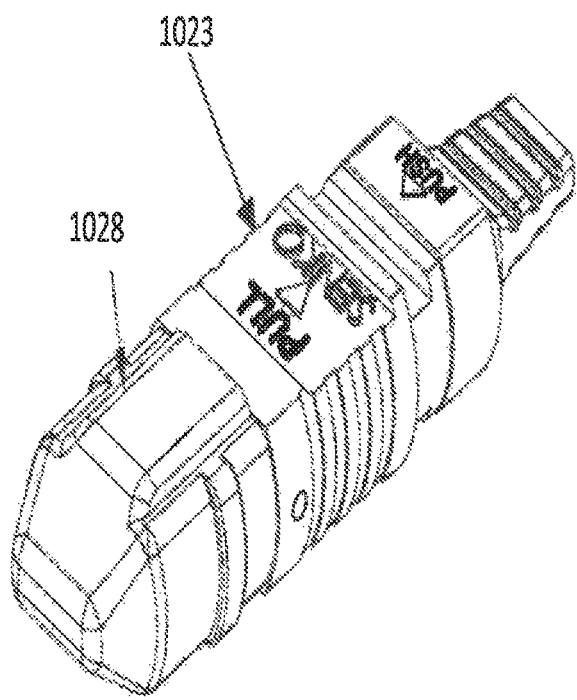
FIG. 10A is a perspective view of an example dust cap and an optical connector.
Figure 10B:
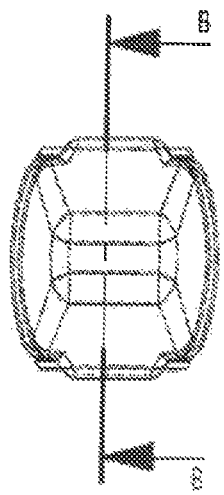
FIG. 10B is a front view of an example dust cap.
Figure 10C:
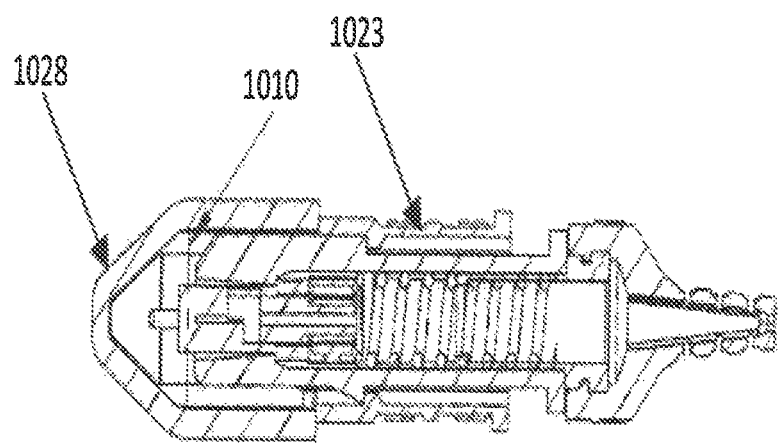
FIG. 10C is a cross sectional side view of an example dust can and an optical connector.

Other embodiments may exist regarding various types of dust caps or plugs. One additional non-limiting example, that shown in FIGS. 10A-10C, may comprise a cleaning connector dust cap 1028 that is placed over the optical connector 1023. As discussed herein, a dust cap 1028 may be used to protect ferrules from dirt and debris. As shown in the cross section of FIG. 10C, the dust cap 1028 may slide over the optical connector 1023. Inside the dust cap 1028 may be a gel 1010, as discussed herein, which contacts the ferrules as well as the end of the optical connector. This constant contact not only provides an additional layer of protection from dust and debris, but also removes any previous debris from the area due adhesive properties.

Accordingly, as described herein, various embodiments may utilize a cleaning gel that is applied to a stick, dust cap, or replaceable cartridge. In some embodiments, the gel may be applied as a liquid, which becomes to a gel overtime. Thus, in some embodiments, (e.g., where the replaceable cartridge isn't utilized), the cleaning gel must then be contained during the cooling/hardening process. Thus, dust cap designs and/or gel stick designs cannot have a cutout where the gel will be present, as this would cause the liquid gel to leak out prior to hardening. In some embodiments, the cleaning gel is placed into a replaceable cartridge, which allows a user to easily swap out the cartridge thus reducing waste and cost. In some embodiments, the cartridge itself is thrown away with the gel, and in alternative embodiments, the cartridge may be reused and/or refilled with new liquid gel after removal of the gel that has reached end of life.

Typically, where a dust cap is taken off of a connector, a user then further cleans the end-face, using one of the known methods, and then inserts the connector into the adapter. Alternatively, embodiments discussed herein, specifically those utilizing both adapter and connector dust caps include cleaning gel solutions, maybe used to further reduce the risk of dust ending up on the end-face of the connector, and thus increase reliability and the life of the connector. This is because dust on end-face of the connector can cause damage to the end-face. Ferrules are extremely sensitive, and although dust and debris particles may be small, they can still damage the flat surfaces and/or scratch the surface, and thus weaken the connection strength. In the case of fiber-optic ferrules, damage or scratching can cause signal loss (i.e., insertion and return loss).

Thus, some embodiments may utilize a gel stick cleaner to clean the entire MPO/MT end-face, as well as to clean lensed MT/MXC end-faces. Additionally, embodiments may use a gel stick that has a reusable stick handle and replaceable gel head, that is easily removable from the stick handle, and is beneficial in both use and cost. With the potential of hundreds of MPO/MT/Lensed MT ferrule end-faces to clean, having removable gel heads helps address the problem of having to dispose of hundreds of gel sticks while in the field.

Accordingly, some embodiments, may have a molded stick with a replaceable cartridge used for the cleaning of fiber optic MPO/MT end-faces. The cartridge may contain an adhesive gel on the end to capture dust and particles that may build up on an MPO/MT end-face. The stick may then be used in a push-pull motion as it is inserted in an MPO adapter/receiver. The gel-tipped cartridge then cleans the surface of the end-face. Generally, an end-face may have pins (i.e., male) or no pins (i.e., female). In some embodiments, the gel tip is pressed against the end-face and sticks to any debris/dust/particles on the end-face, cleaning the end-face without scratching the surface of said end-face. The removable cartridges, discussed herein, may be packaged via large packs with an easy access method to attach a new cartridge to a stick.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean, at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A cleaning device for removing debris from the end surface of a ferrule of a fiber optic connector, comprising:
   a housing having a longitudinal axis and a front end portion and a rear end portion spaced apart along the longitudinal axis, the housing having an interior chamber comprising an enclosed rear end and an open front end that opens through the front end portion of the housing, the interior chamber having a perimeter that extends along the longitudinal axis from the enclosed rear end to the open front end, the housing comprising a chamber perimeter wall that extends circumferentially around the interior chamber along the longitudinal axis and defines the perimeter of the interior chamber, the housing further comprising a rear chamber wall adjacent the rear end portion of the housing, the rear chamber wall extending transverse to the longitudinal axis and defining the enclosed rear end of the chamber;
   a gel disposed in the interior chamber on the rear chamber wall and the chamber perimeter wall such that the gel is accessible through the open front end of the interior chamber;
   wherein the second end portion of the housing comprises a fitting configured to releasably couple the housing to a separate body;
   wherein the housing is sized and shaped to be received in a receptacle of an adapter.

2. The cleaning device of claim 1, wherein a first end of the housing is sized and shaped to remove debris from the end surface of a Multi-fiber-Push-On (MPO) fiber optic connector.

3. A combination comprising the cleaning device of claim 1 and the separate body, wherein the separate body has a front end portion comprising a mating fitting that is configured to releasably couple to the fitting of the housing.

4. The combination of claim 3 wherein the fitting of the housing comprises a cavity at a second end portion of the housing and the mating fitting of the separate body comprises a resiliently deflectable tab that has a protrusion configured to be lockingly received in the cavity.

5. The combination of claim 4 wherein the resiliently delectable tab is configured to deflect inwardly to allow the protrusion to pass into the cavity of the housing.

6. The cleaning device of claim 1 further comprising a cap placed over a first end portion of the housing for protecting the gel from debris while not in use.

7. A cleaning system comprising the cleaning device of claim 1 and a cap configured to be placed over or in the receptacle of the adapter for protecting a cleaned end surface of a ferrule.

8. The cleaning device of claim 1 wherein a second end of the housing further comprises a plug wall for mating with an outer surface of the receptacle thereby preventing airborne debris from entering the adapter.

9. The cleaning device of claim 8 wherein the housing has a protrusion at the second end beyond the plug wall for removing the housing from the adapter.

10. The cleaning device of claim 1 wherein the housing further comprises an indentation accepting a latch or hook within the adapter for securing the housing, to the adapter.

11. The cleaning device of claim 1 wherein the fitting is spaced apart rearward of the rear chamber wall along the longitudinal axis.

12. The cleaning device of claim 1, wherein the fitting comprises a perimeter wall that extends circumferentially around the longitudinal axis and defines an interior space to the rear of the rear chamber wall, the perimeter wall being configured to receive an end portion of the separate body in the interior space.

\* \* \* \* \*